United States Patent [19]

Menon

[11] Patent Number: 6,027,757
[45] Date of Patent: *Feb. 22, 2000

[54] PROCESS FOR PRODUCING DEHYDRATED PLANT MATTER OR PORTIONS THEREOF

[75] Inventor: Gopi Menon, Riverside, Calif.

[73] Assignee: Amway Corporation, Ada, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,849

[22] Filed: Aug. 8, 1997

[51] Int. Cl.$^7$ ..................................................... A23B 7/005
[52] U.S. Cl. ........................ 426/443; 426/615; 426/638; 426/640; 426/456; 426/506; 426/509; 426/510
[58] Field of Search ..................................... 426/638, 640, 426/443, 456, 506, 509, 510, 511, 615

[56] References Cited

U.S. PATENT DOCUMENTS

| | | | |
|---|---|---|---|
| 3,009,817 | 11/1961 | Hendel et al. | 99/207 |
| 3,879,568 | 4/1975 | Luh et al. | 426/640 X |
| 3,973,047 | 8/1976 | Linaberry et al. | 426/473 |
| 4,659,579 | 4/1987 | Cuel | 426/640 X |
| 4,748,038 | 5/1988 | Lewis et al. | 426/465 |
| 4,758,441 | 7/1988 | Negishi et al. | 426/465 |
| 4,788,072 | 11/1988 | Kawamura | 426/506 X |
| 5,002,787 | 3/1991 | Fraile et al. | 426/223 |
| 5,227,183 | 7/1993 | Aung et al. | 426/638 X |
| 5,338,558 | 8/1994 | Aung et al. | 426/327 |
| 5,368,873 | 11/1994 | Aebi et al. | 426/638 X |
| 5,397,584 | 3/1995 | Aung et al. | 426/327 |
| 5,645,876 | 7/1997 | Subramaniam et al. | 426/640 X |

OTHER PUBLICATIONS

J.C. Jackson, et al., "Optimization of Blanching for Crispness of Banana Chips using Response Surface Methodology," J. of Food Science, vol. 61, No. 1, pp. 165–166, (1996).

*Primary Examiner*—Milton Cano
*Attorney, Agent, or Firm*—Brinks Hofer Gilson & Lione

[57] ABSTRACT

The present invention provides a process for obtaining a dehydrated plants, by blanching the chopped plant and subsequently drying the chopped plant until its moisture content is less than 3%. The product retains its natural color and has low microbial content.

24 Claims, 4 Drawing Sheets

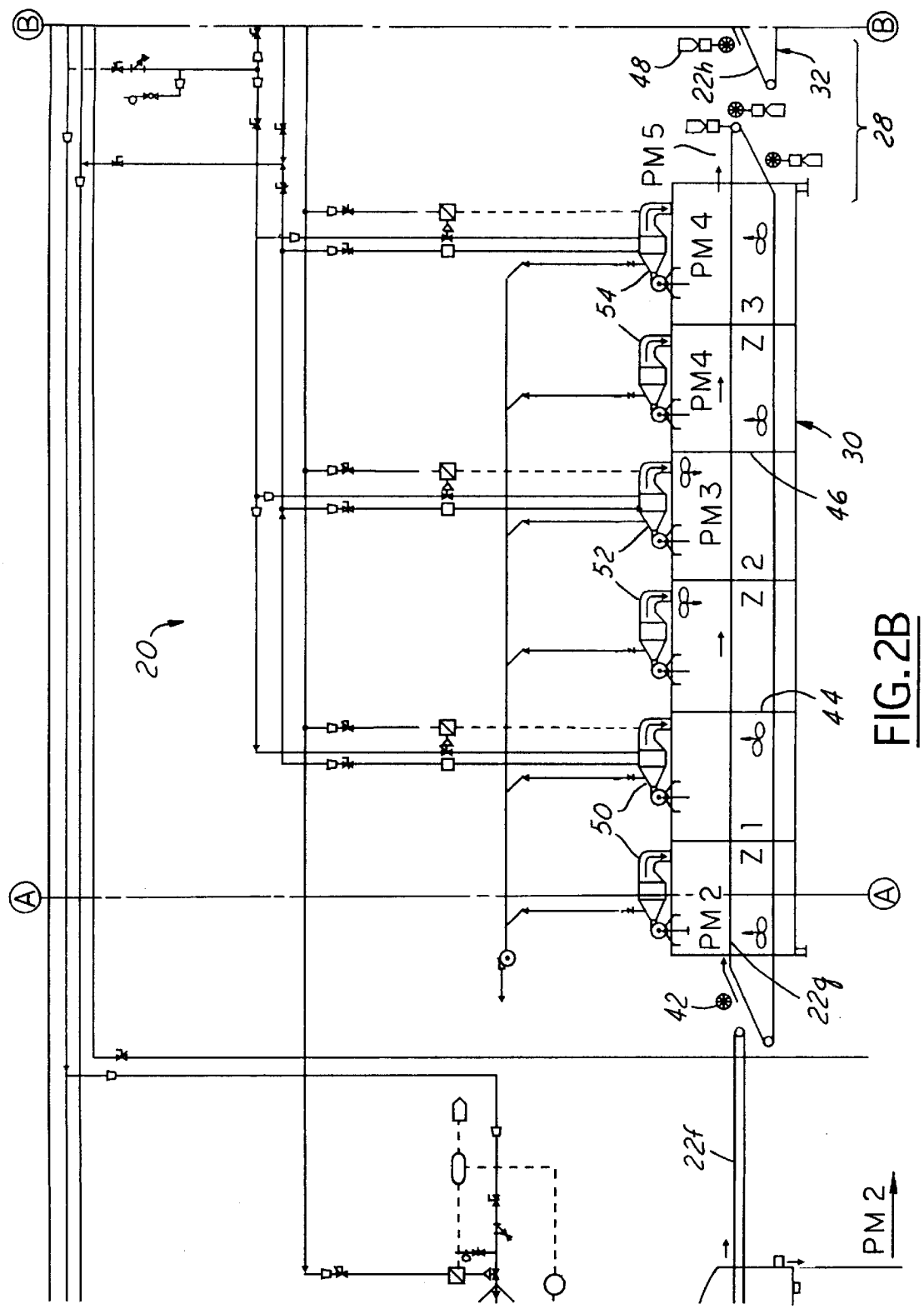

PROCESS FOR PRODUCING DEHYDRATED PLANT MATTER OR PORTIONS THEREOF

TECHNICAL FIELD

This invention relates to method and apparatus for dehydrating a plant or portions thereof including blanching and drying.

BACKGROUND OF THE INVENTION

This invention provides a method of and apparatus for obtaining a dehydrated plant, while preserving its natural color, preserving its phytonutrients and controlling the microbial content in the resulting product.

Dehydrated plants are consumed in a variety of forms, from snacks slices to food supplements and vitamins. The main challenges with current dehydrating techniques is to obtain a dehydrated plant product with low microbial levels and natural color.

To obtain low microbial levels, plants are currently harvested and immediately (within 3 hours) dehydrated at high temperatures (greater than 300° F.) for short residence times (10–15 minutes). While this lowers the bacterial count, it does not reduce the counts to desirable levels. Accordingly, the obtained plant product is currently subjected to hot room pasteurization (greater than 180° F. for 72 hours). This produces a product which may meet the microbial standards, but changes the natural color of the plant to an unappealing brownish hue.

To solve the color degradation problem, Linaberry et al. (U.S. Pat. No. 3,973,047) describe a method of dehydrating vegetables by partially dehydrating with hot air to a moisture content less than about 30%, thereafter contacting the vegetables with a hot humid gaseous medium (a pasteurization step) and, finally, dehydrating with hot air so as to reduce the moisture content of the vegetable to less than about 8%. The microbial content of the product is $\leq 40$ coliform/gram.

Cuel (U.S. Pat. No. 4,659,579) describes a dehydration process for moist vegetables, in particular alfalfa or beet pulp, which is aimed at reducing the energy required to dehydrate. The process involves first pressing the liquid from the vegetables, concentrating the volume of the liquid, and dehydrating the vegetables with vapor from the concentrating step. Neither the color nor the microbial content of the end product is disclosed.

Luh et al. (U.S. Pat. No. 3,879,568) describe a method of obtaining crisp, dehydrated banana slices, by slicing the fruit, steam blanching the fruit (such that the interior of the slices reaches about 85 to 95° C.) and, finally, dehydrating the fruit. Apparently, the product is not substantially discolored. The microbial content of the product is not disclosed.

Similarly, Jackson et al., J. Food Science, 1996, 61(1): 165–166 teach blanching banana chips prior to deep-frying to increase crispness. The microbial content and color of the product are not disclosed.

Aebi et al. (U.S. Pat. No. 5,368,873) describe a method of dehydrating vegetables by bathing the vegetables in a bath containing an osmotic agent and thereafter drying the vegetables.

Similarly, Aung et al. (U.S. Pat. No. 5,277,183) describe a method of dehydrating aromatic plant product by treating the fresh product with an osmotic agent and thereafter drying the plant to obtain a product which exhibits the overall color, flavor, phytonutrients, aroma and overall appearance similar to the fresh cut plant.

Unfortunately, none of the above teach or disclose dehydrated plant products with natural color, high phytonutrient content and low microbial content. Thus, a method of providing a dehydrated plant product with low microbial content and with natural color and phytonutrient content is desirable. Similarly, an efficient and effective apparatus for carrying out a method for producing such plant product is needed.

SUMMARY OF THE INVENTION

Accordingly, the present invention provides a method of obtaining dehydrated plants, while preserving its natural color and phytonutrient content and controlling the microbial content of the resulting product.

The process of the present invention involves blanching a plant for at least 4 minutes and subsequently drying the plant until its moisture content is less than about 3%.

The invention further includes a novel dehydrator apparatus for blanching and drying a plant or portions thereof in accordance with the present invention.

BRIEF DESCRIPTION OF THE DRAWINGS

FIGS. 2A–C are schematic drawings of the dehydrator, each figure illustrating a portion of the dehydrator.

DETAILED DESCRIPTION OF PREFERRED EMBODIMENTS

Figure 1:
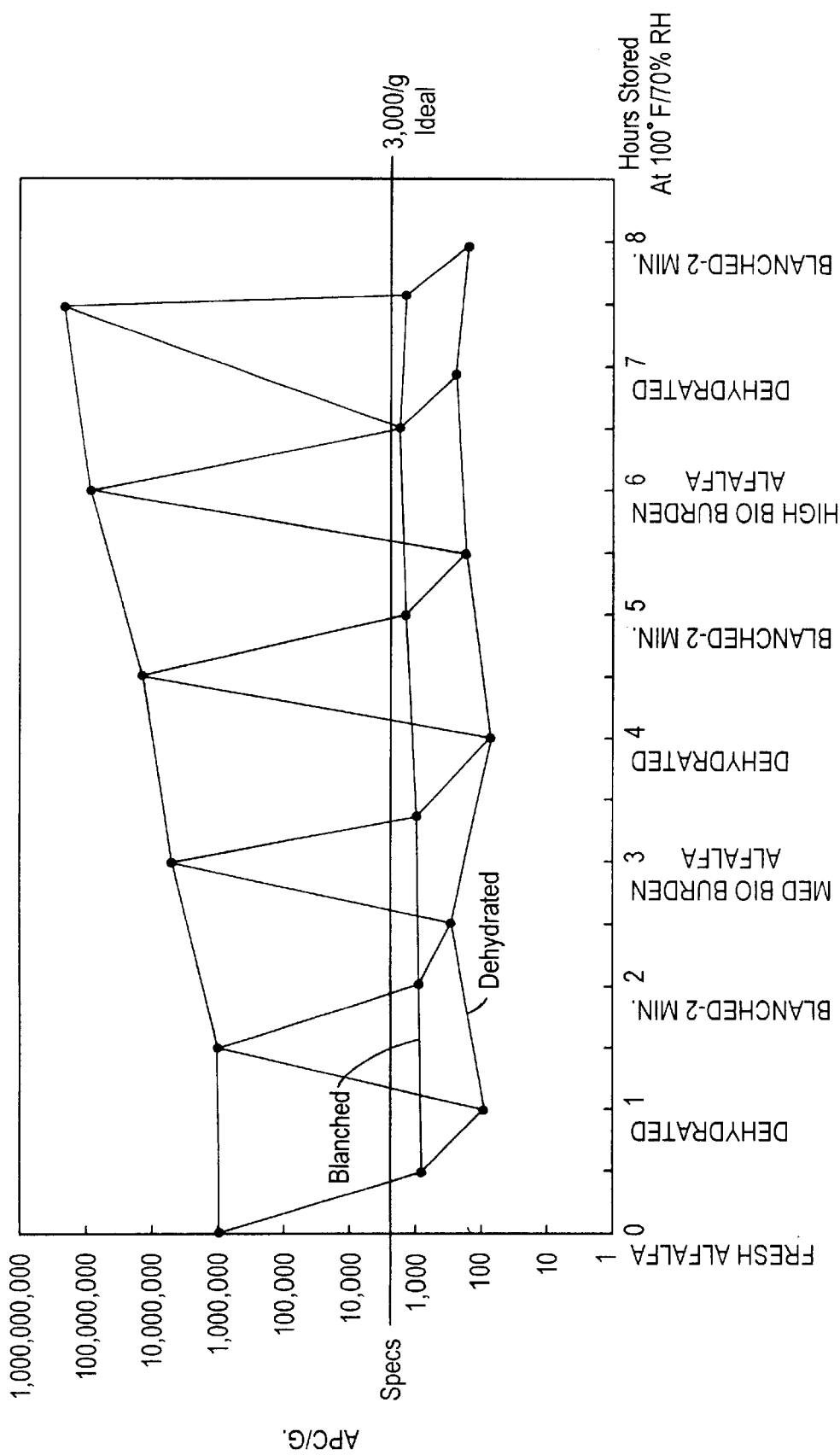
FIG. 1 is a graph depicting the microbial content of alfalfa following harvesting, blanching and dehydrating, using the process of the present invention. The initial microbial content of the alfalfa prior to processing is in the range of 1,000,000 to 110,000,000 counts/g. APC is aerobic plate count. The bacterial content currently mandated is 3,000 counts/gram.

The general process for carrying out the present invention will first be described. Then, an apparatus utilized in practicing the process will be discussed.

The process of the present invention comprises blanching a plant or portions thereof for at least 4 minutes and subsequently drying the plant until its moisture content is less than about 3%.

Any plant can be used in accordance with this invention, including fruits, vegetables and herbs.

Suitable fruits include cherries (particularly acerola cherries), lemon peel, mangos, nectarines, orange peel, papayas, peaches, etc.

Suitable vegetables include seed and pod vegetables, fruiting vegetables, leafy vegetables and root crop vegetables (such as beet, carrot, onion and potato). Leafy vegetables, including alfalfa, celery, fennel, parsley and spinach, are preferred.

Suitable herbs include alder, amaranth, balm, basil, bilberry, blackberry, blind nettle, calendula, chamomile, dandelion, echinacea, goldenrod, lavender, marjoram, mint, nettle, parsley, passion flower, primrose, raspberry, rosemary, sage, sassafras, tarragon, thyme, wintergreen, etc.

The plants are suitably harvested and processed within 24 hours, preferably within 12 hours, more preferably within 8 hours. Alternatively, the harvested plants are stored at less than 25° C., preferably less than 4° C. for no more than 24 hours before processing. Harvested plants can optionally be washed prior to processing. In addition, harvested plants can be preliminarily prepared for processing, by trimming, peeling, cutting, slicing, dicing, etc.

Blanching of a plant or portions thereof is generally conducted using means such as tunnel, tray, and continuous belt type apparatus. The preferred apparatus will be described after the general method for obtaining a dehydrated plant. The humidity of the air in the apparatus is preferably about 80 to 100%, more preferably about 90–100%. The temperature in the apparatus is greater than about 180° F., preferably from about 180–212° F., more preferably about 180 to 200° F. The harvested plants are blanched for a period of time of at least 2 minutes, preferably from about 2 to about 4 minutes, more preferably about 4 minutes.

Following blanching, the plant is dehydrated using means, such as tunnel, tray, and continuous belt type apparatuses, as will be described in more detail below. The temperature of the air in the drying apparatus may range from about 180° F. to about 240° F. Dehydrating can be achieved in multi-stages, for example by employing higher temperatures during the first stages of the drying cycle. The temperature and residence times during the drying step (or cycle) in part depend upon the nature of the plant. In general, the drying step is at least about 60 minutes and is halted when the moisture content of the plant product is less than 8%, preferably less than about 3% as measured by O'Hans Moisture Balance Test.

In one embodiment, alfalfa is blanched for 2 minutes at 180° F. in steam and then subjected to 2-stage dehydration. The first stage comprises drying at 240° F. until the moisture content is less than 55% and the second stage comprises drying at 180° F. until the final moisture content of the product is less than 8%.

The dehydrated plant of the present invention has a bacterial content of less than 3,000 counts/gram, preferably less than 1,000 counts/gram as measured by aerobic plate count (APC).

The dehydrated plant or the present invention have natural (that is, their original) color, although it should be understood that the color may intensify or diminish. The color of the plant product is at least retained about 40%, as measured by visual observation. For leafy green vegetables such as alfalfa, the color of the processed product is preferably green.

The phytonutrient content of dehydrated plant product of the present invention is also similar to that of the plant prior to dehydration. At least about 40%, preferably about 60%, more preferably about 80% of the phytonutrient content is retained following the dehydration process of the present invention.

The dehydrated plant of the present invention can be further processed, for example by milling, screening, tabulating, encapsulating, etc.

The dehydrated plant can be stored unpackaged for up to 24 hours at 25° C. in a low moisture atmosphere (less than about 50% humidity, preferably less than about 40% humidity). Preferably, the processed plant is packaged or sealed. In one embodiment, the packaged processed plant can be stored for up to 2 years, preferably no more than 6 months.

Figure 2A:
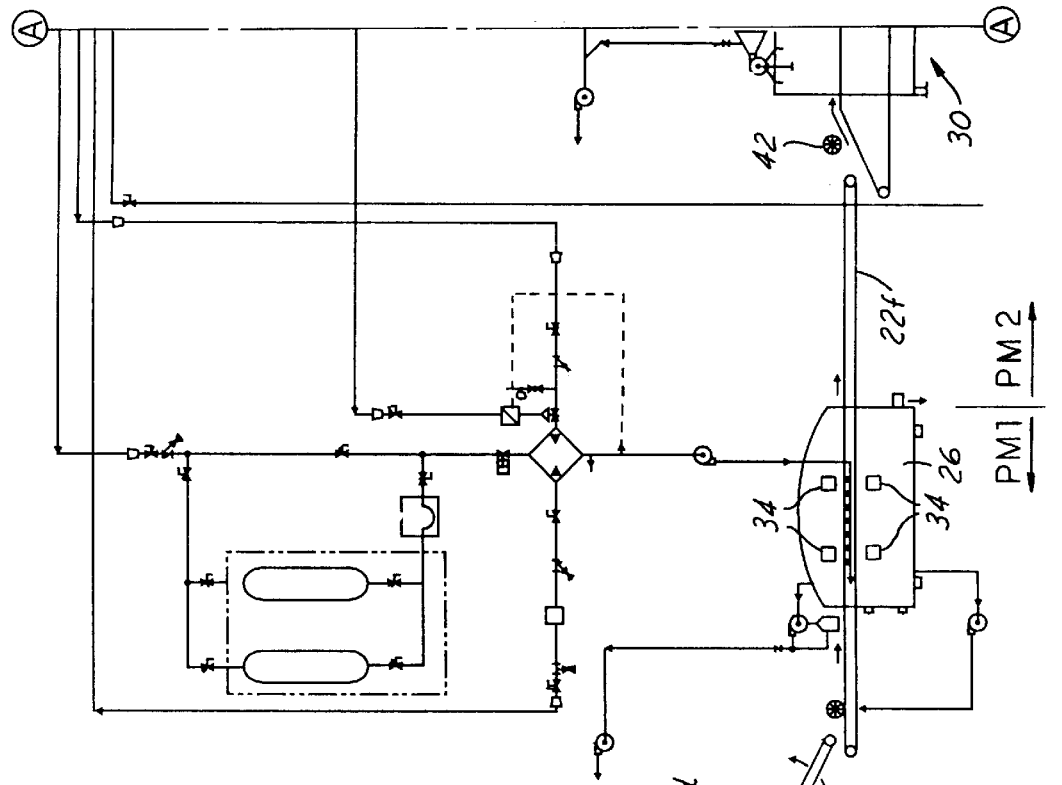
Figure 2A:
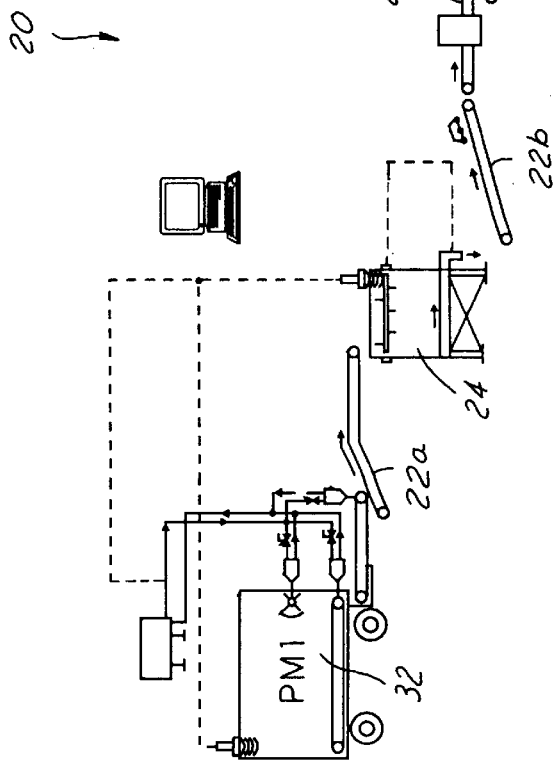
Figure 2C:
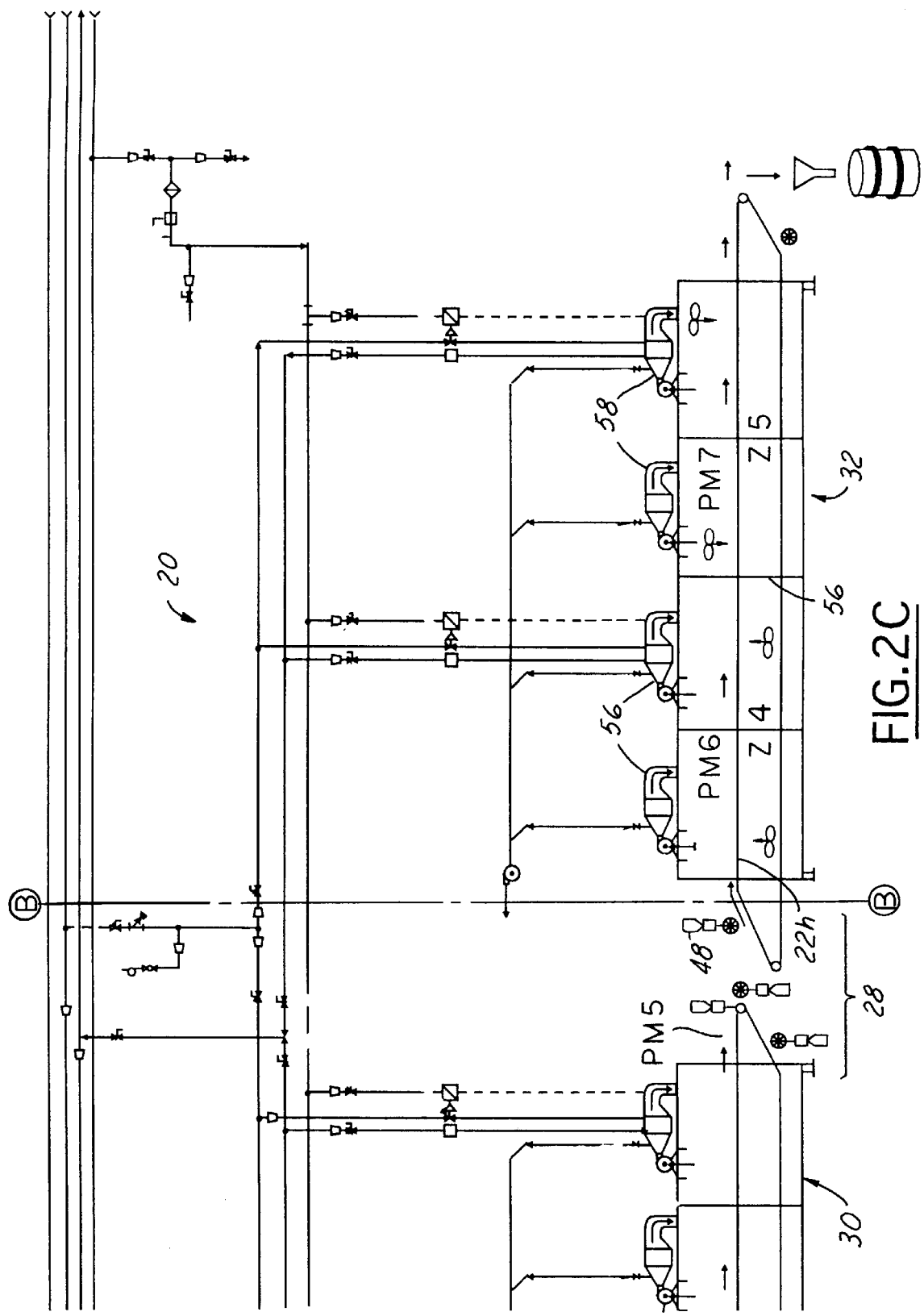

The preferred apparatus for conducting the process of the present invention is shown in FIG. 2A–C. Dehydrator 20, made in accordance with the present invention, is schematically illustrated in FIGS. 2A–C. Raw plant matter PM, such as chopped alfalfa, is introduced into a conveyor system 22 including a number of belt conveyors 22a–g. Conveyor system 22 transports the plant matter PM through a hopper 24, a product blancher 26, and a dryer 28. Dryer 28 includes first and second product dryers 30 and 32 for two-stage drying. As a result of processing the plant matter in dehydrator 20, the plant matter is sequentially blanched and dried so as to be ready for further processing into liquid and powder compositions. Because of the unique apparatus and methods employed during the dehydration process, plant matter output from dehydrator 20 retains a large portion of its original natural color and a high level of nutrients, such as phytofactors, while maintaining a relatively low level of bacterial count, preferably below 10,000 counts/gram and most preferably below 3,000 counts/gram. For purposes of illustration, the plant matter PM to be described herein is chopped alfalfa. However, this invention envisions similarly processing other plant matter by first blanching and then drying the plant material in a controlled manner to achieve low levels of bacterial count while maintaining much of the plant matter's original color and nutrient content.

Referring now to FIG. 2A, plant matter PM1 is introduced into conveyor system 22 by way of a first belt conveyor 22a. In this example, a farm trailer 32 is used to haul plant matter PM1, i.e. chopped alfalfa, from a field to dehydrator 20 and dumped onto first belt conveyor 22a of conveyor system 22. Of course, other means of transporting plant matter to dehydrator 20 could be used such as belts, augers, elevators, pneumatic tubes, etc. Belt conveyor 22a dumps plant matter PM1 into alfalfa hopper 24 for storage. Hopper 24, in this preferred embodiment, has a capacity of 250 cubic feet. Typically, plant matter PM1 resides in hopper 24 for approximately 20 minutes.

Located in the lower portion of hopper 24 is an auger system 42 which carries plant matter PM1 from surge hopper 24 and deposits it onto a second belt conveyor 22b. Plant matter PM1 is carried up inclined belt conveyor 22b and placed on a horizontal weigh belt conveyor 22c. Even as plant matter PM1 is transported on weigh belt conveyor 22c, the relative mass of PM1 thereon is determined. Depending on the sensed mass of plant matter PM1 on weigh belt conveyor 22c, a feedback signal is sent back to auger system 42 to adjust the amount or mass of plant matter PM1 which is dumped onto belt conveyor 22b per unit time. Accordingly, a uniform amount of plant matter PM1 is placed on belt conveyor 22b for processing.

Plant matter PM1 is delivered from weigh belt conveyor 22c onto a fourth inclined belt conveyor 22d. Belt conveyor 22d passes plant matter PM1 to a declining oscillating belt conveyor 22e. Oscillating belt conveyor 22e is pivoted at its upstream end so that its downstream end may swing horizontally to distribute plant matter PM1 onto a perforated blancher belt conveyor 22f. In this preferred embodiment, blancher belt conveyor 22f is fifteen (15) feet long by ten (10) feet wide. Plant matter PM1 is spread onto blancher belt conveyor 22g ideally at a thickness of about two and one-half (2½) inches. Blancher belt conveyor 22g moves at preferred speed of between one to one and one-half (1–1½) feet per minute.

Raw material can travel on a perforated belt 22f at speeds that provide residence times of 2–8 minutes of steam heating. A bed of raw material (such as alfalfa, spinach, parsley, etc.) travels at a bed depth of 2–2.5 inches on perforated belt 22f. Steam is generated from hot water flashing at 180° to 212° F. The steam then traverses up through the bed. There are temperature probes 34, ideally thermocouples, below and above the raw material bed to ensure that there is uniform distribution of heat around the plant matter to about 180° F. The goal is to get every part of the raw material to a minimum of 161° F., above which temperature most Salmonella and other bacteria are killed. As the bed of raw material moves through blancher 26, the belt speed may be varied as required to provide sufficient residence time to achieve satisfactory kill levels without overheating or drying. The plant matter PM is now designated as plant matter PM1 upon being blanched and leaving blancher 26. The steaming and heating of plant matter PM1 helps kills bacteria and microbial organisms. Ideally, the bacteria count is reduced to below at least 10,000 counts/gram and more preferably below 3000 counts/gram during the blanching process. Blancher 26 in this preferred embodiment is a tri-mode blancher (available from National Drying Machinery Co., of Philadelphia, Pa.). Tri-mode blancher 26 can blanch plant matter using liquid immersion, overhead drenching, or by passing steam upwardly through blancher belt conveyor 22f. In this particular case where alfalfa is blanched, ideally blancher 26 is operated in the steam blanching mode. Temperature probes 34 are used to monitor the temperature within blancher 26 and provide feedback to blancher 26 to control the environment within blancher 26.

Referring now to FIG. 2B, blancher belt conveyor 22f delivers blanched and blanched plant matter PM2 to a perforated belt conveyor 22g which runs through first product dryer 30. A pin fluffer 42 breaks up clogs or bunches of plant matter PM2 into smaller, more uniform bunches prior to plant matter PM2 passing into first product dryer 30.

Product dryer 30 can be characterized as having three discrete zones Z1–Z3 which are separated by plenum walls 44 and 46 having slotted openings (not shown) therein to allow the plant matter to move from zone to zone. Product dryer 30 allows for rapid evaporation of surface moisture from about 86% maximum to 55% at its outlet. Ideally, hot dry air is used in product dryer 30 and will be maintained at 240° F. In zone Z1 hot air is passed upwardly through perforated belt conveyor 22g drying plant matter PM2 (wet dense alfalfa in this example) from approximately 86% moisture to plant matter PM3 containing about 72% moisture. Wavy arrows in FIG. 1 indicate the upward movement of hot air in zone Z1. Blowers 52, 54 and 56 drive the hot air through belt conveyor 22g. Hot air is passed downwardly in zone Z2 through belt conveyor 22g and plant matter PM3 to further reduce the moisture content to about 67% with resultant plant matter PM4. The downward passage of hot air ensures moisture removal from top to bottom in the layer of plant matter. Hot air is again passed upwardly in zone Z3 through belt conveyor 22g and plant matter PM4 to produce plant matter PM5. The resultant plant matter PM5 will leave product dryer 30 having a moisture content of approximately 55%, with water contained mainly within stems with surface moisture having been generally removed.

Plant matter PM5 is carried from conveyor belt 22g and first product dryer 30 to a perforated conveyor belt 22h disposed within second product dryer 32. A second pin fluffer 48 is used to again breakup clumps of plant matter PM5. Second product dryer 32 has zones Z4 and Z5 separated by a plenum wall 46. Blowers 56 and 58 drive heated air upwardly and downwardly in respective zones Z4 and Z5. In zone Z4, air moves upwardly to ensure any moisture caught in between layers of sticky raw material is removed. Plant matter PM5 receives upwardly moving air at 180° F. drying plant matter PM5 down to plant matter PM6 having about 27% moisture. Finally, downwardly moving air in zone 5 further reduces the moisture content of the chopped alfalfa to a desired 3% in plant matter PM7. In zone 5, almost all the moisture is internal to the raw material, (pores or stems of plants). The temperature in product dryer 32 is maintained at 180° F. The belt speed is preferably maintained at about half the speed of belt conveyor 22. The approximate total time in first product dryer 30 is 20 minutes and in second product dryer 32 about 40 minutes.

A metal detector is placed at the exit of product dryer 32 to assist in removing any random pieces of metal that might have been introduced into the plant matter PM during harvesting or further processing.

In the case of processed alfalfa, dried vegetative matter VM7 is further transported by a belt conveyor 22i to a mill where plant matter PM7 is chopped into smaller pieces. A sifter with a 60 mesh screen is used to separate stem components from leaf components. The stem components are more resilient and resist breaking into small pieces. The smaller leaf components pass through the sifter and are collected in bags for further processing. Likewise, the stem pieces are collected and bagged for further processing. Alternatively, these dried components can be pneumatically collected and stored in a collection bin.

EXAMPLE

Example 1

Alfalfa was harvested, stored at 77° F. for the times shown in Table 1, blanched at 180° F. for 2–5 minutes, dried at 240° F. until the moisture content was less than 50%, and then dried at 180° F. until the moisture content was less than 3%. The plant was tested for bacterial content prior to blanching, after blanching, and after the final drying step. The results are shown below in Table 1 and FIG. 1.

TABLE 1

Bacterial content (counts/gram) at various Storage Times prior to blanching

|  | Fresh | 2 hours | 3 hours | 4 hours | 5 hours | 6 hours |
| --- | --- | --- | --- | --- | --- | --- |
| prior to blanching | $\sim 1 \times 10^7$ | $\sim 1 \times 10^7$ | $\sim 1 \times 10^7$ | $>1 \times 10^8$ | $>1 \times 10^9$ | $>1 \times 10^9$ |
| following blanching | <3,000 | <300 | <800 | <1,000 | <1,100 | <300 |
| following drying | <1,100 | <100 | <10 | <80 | <200 | <70 |

The color of the product was green. Thus, the process of this invention produces a dehydrated plant product with low microbial content, with high retention of phytonutrients and with natural color.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A process for producing a dehydrated plant or portion thereof, comprising steam blanching a chopped plant or portion thereof in a solution consisting essentially of water for at least about 2 minutes, and subsequently drying the chopped plant or portion thereof until the moisture content is less than about 3% and the phytonutrient content is at least about 40%.

2. The process of claim 1, wherein said plant is a fruit, vegetable or herb.

3. The process of claim 2, wherein the plant is alfalfa, spinach, parsley, carrots, lemon peels, celery, fennel or cherries.

4. The process of claim 3, wherein the plant is alfalfa.

5. The process of claim 1, wherein the plant or portion thereof is stored for less than about 3 hours from the time it was harvested to the beginning of the steam blanching step.

6. The process of claim 1, wherein the drying step comprises the following 2 stages:

(a) drying at 225 to 250° F. until the moisture content is below about 55%, and (b) drying at 130 to 200° F. until the moisture content is below about 3%.

7. The process of claim 6, wherein the temperature in step (a) is about 240° F. and wherein the temperature of step (b) is about 180° F.

8. The process of claim 1, wherein the microbial content of the dehydrated plant or portion thereof is less than about 3,000 counts/gram.

9. The process of claim 1, wherein the phytonutrient content is at least about 60%.

10. The process of claim 1, wherein the phytonutrient content is at least about 80%.

11. A dehydrated chopped plant product produced by the process of claim 1 wherein the microbial content is less than about 3,000 counts/gram and wherein the phytonutrient is at least about 40%.

12. The dehydrated plant product of claim 11, wherein the microbial count is less than about 1,000 counts/gram.

13. The process of claim 11, wherein the phytonutrient content is at least about 60%.

14. The process of claim 11, wherein the phytonutrient content is at least about 80%.

15. A process for producing a dehydrated plant or portion thereof, consisting of:

blanching a chopped plant in a solution consisting essentially of water for at least 2 minutes; and subsequently drying the chopped plant until its moisture content is less than about 3%.

16. The process of claim 15, wherein said plant is a fruit, vegetable or herb.

17. The process of claim 16, wherein the plant is alfalfa, spinach, parsley, carrots, lemon peels, celery, fennel or cherries.

18. The process of claim 17, wherein the plant is alfalfa.

19. The process of claim 15, wherein the plant or portion thereof is stored for less than about 3 hours from the time it was harvested to the beginning of the steam blanching step.

20. The process of claim 15, wherein the drying step comprises the following 2 stages:

(a) drying at 225 to 250° F. until the moisture content is below about 55%, and (b) drying at 130 to 200° F. until the moisture content is below about 3%.

21. The process of claim 20, wherein the temperature in step (a) is about 240° F. and wherein the temperature of step (b) is about 180° F.

22. The process of claim 15, wherein the microbial content of the dehydrated plant is less than about 3,000 counts/gram.

23. A dehydrated chopped plant product prepared by the steps of:

blanching a chopped plant in a solution consisting essentially of water for at least 2 minutes; and subsequently drying the chopped plant until its moisture content is less than about 3%.

24. A dehydrated chopped plant product produced by the process of claim 15 consisting of plant matter wherein the microbial content is less than about 3,000 counts/gram.

* * * * *